United States Patent [19]

Kunzinger

[11] Patent Number: 6,011,777
[45] Date of Patent: Jan. 4, 2000

[54] USE OF SHARED TABLE IN OPERATION OF SEGMENTED ATM CONNECTIONS

[75] Inventor: Charles Anthony Kunzinger, Morrisville, N.C.

[73] Assignee: International Business Machines Corporation, Armonk, N.Y.

[21] Appl. No.: 08/819,069

[22] Filed: Mar. 18, 1997

[51] Int. Cl.[7] .................................. H04L 12/56

[52] U.S. Cl. ............ 370/232; 370/253; 370/395; 709/234

[58] Field of Search ................... 370/230, 231, 370/232, 233, 234, 235, 252, 253, 389, 395, 396, 397, 398, 399, 400, 409; 709/232, 233, 234, 235

[56] References Cited

U.S. PATENT DOCUMENTS

| | | | |
|---|---|---|---|
| 5,649,110 | 7/1997 | Ben-Nun et al. ................... | 370/235 |
| 5,745,697 | 4/1998 | Charny et al. ...................... | 709/233 |
| 5,754,530 | 5/1998 | Awdeh et al. ...................... | 370/232 |
| 5,812,527 | 9/1998 | Kline et al. ......................... | 370/232 |
| 5,898,669 | 4/1999 | Shimony et al. ................... | 370/232 |

Primary Examiner—Alpus H. Hsu
Attorney, Agent, or Firm—Gerald R. Woods

[57] ABSTRACT

The invention relates to asynchronous transfer mode (ATM) connections that are segmented into separate feedback control loops. A virtual destination (VD) of a given segment provides feedback to the virtual source (VS) of the same segment. The feedback is based on flow control information provided by the VS of the adjacent downstream segment. Information is transferred across segment boundaries by using a data table shared by the VS of one segment and the VD of the adjacent upstream segment. The actual Allowable Cell Rate for a segment is written into the table, from which it can be extracted by the VD of the next upstream segment. VS/VD switches are implemented in either a centralized or a distributed configuration.

10 Claims, 4 Drawing Sheets

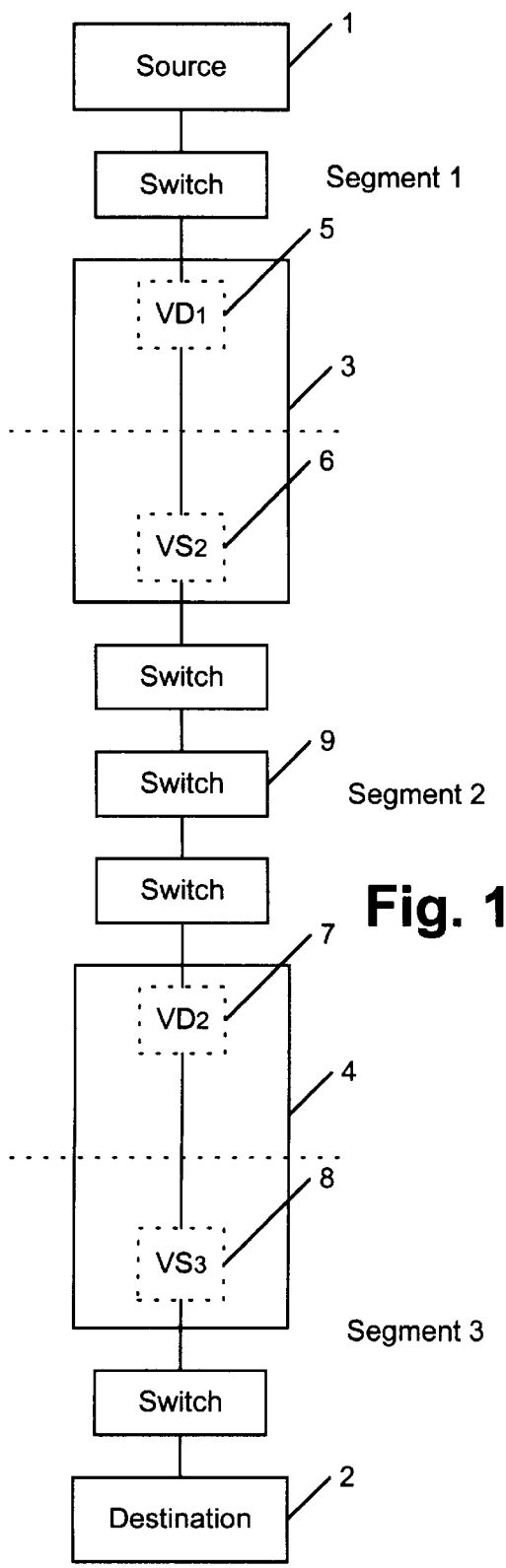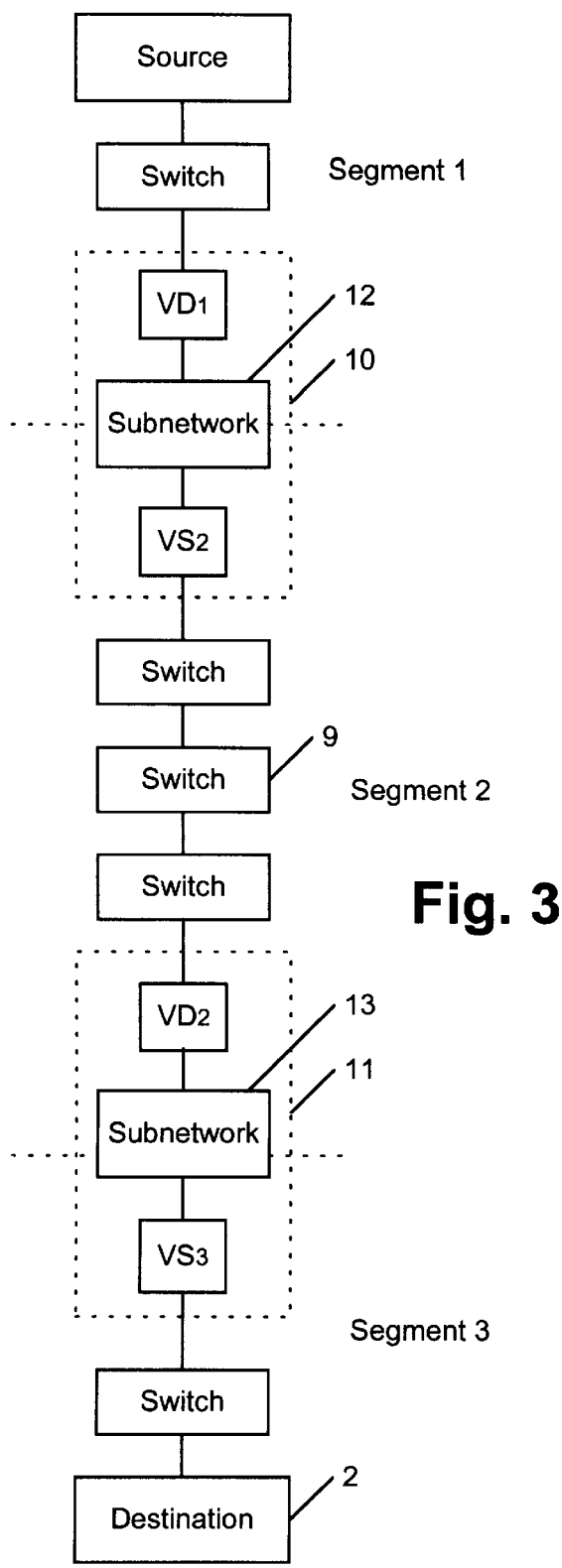

USE OF SHARED TABLE IN OPERATION OF SEGMENTED ATM CONNECTIONS

FIELD OF THE INVENTION

The present invention relates to an ATM (Asynchronous Transfer Mode) system in which the path from a real source to a real destination is divided into coupled segments, each having its own control loop for flow control information.

BACKGROUND OF THE INVENTION

ATM is an attractive packet-oriented switching and multiplexing technology using fixed length data cells for the transport of broadband digital data exhibiting a broad spectrum of traffic properties and quality of service requirements.

In an ATM network, a connection is normally set up each time a source node wishes to send data to a destination node. The connection setup includes the selection of a route or path through the network and the establishment of service parameters and QoS guarantees for the duration of the connection. Multiple connections between different source-destination pairs can concurrently use the same physical link in the network. To accommodate the different service requirements of different kinds of traffic in an ATM network, different classes of ATM traffic have been defined. The classes of interest here are CBR (Constant Bit Rate), VBR (Variable Bit Rate) and ABR (Available Bit Rate).

CBR traffic is traffic that needs to be transmitted at a specified, substantially constant bit rate. Examples of CBR traffic include real-time audio or video traffic or an ATM network emulating a standard (1.544 Mbit/s) T-1 trunk. CBR traffic is characterized as being delay and jitter intolerant. During setup of a CBR connection, a Peak Cell Rate (PCR) parameter must be negotiated to define the maximum rate at which data can be transported over the connection without creating a significant risk of cell loss. Data is typically transmitted at the full CBR rate over a CBR connection.

VBR or Variable Bit Rate traffic can be real-time (RT) or non-real-time (NRT) in nature. For each VBR connection to be set up, a Peak Cell Rate, a Sustained Cell Rate (SCR) and a jitter tolerance must be negotiated. The negotiated SCR represents the average throughput to be allowed on the connection. While traffic from a VBR source may be accepted at a greater-than-SCR rate for a limited period of time, traffic from the same source must then be throttled back to a less-than-SCR rate for a long enough time to re-establish the SCR over the longer period of time. A negotiated burst tolerance parameter defines how long traffic can be accepted at the greater-than-SCR rate before it must be throttled back.

During these periods of reduced traffic activity and perhaps at other times during network operation, a significant amount of network bandwidth may be unused or idle. The ABR traffic class has been defined in an effort to exploit the availability of idle network bandwidth. ABR traffic is intended to make optimum use of what might otherwise be unused bandwidth while utilizing traffic management techniques to monitor actual or incipient network congestion which might, if not taken into account, lead to unacceptable cell loss during transmission attempts.

The setup of an ABR connection requires negotiation of a PCR parameter that serves the same purpose as it does for the other classes of traffic; namely, to limit the maximum rate at which traffic will be accepted for transmission over the connection. No effort is made to negotiate jitter or burst tolerances for ABR traffic. Instead, the ABR source and the network negotiate a Minimum Cell Rate (MCR) parameter representing the minimum amount of connection bandwidth that will always be available to the ABR traffic source. Generally, the MCR parameter represents the minimum transmission rate which must be available if the ABR traffic source or application is to stay alive; i.e., continue to execute.

For CBR and VBR connections, no effort is made to dynamically control congestion (network traffic loads) from within the network. Where, however, the goal is to utilize idle network bandwidth, it makes sense to attempt to dynamically control congestion through the use of closed-loop management techniques. Such techniques monitor network traffic and provide feedback to a traffic source to permit that source to adjust the rate at which traffic enters the network to levels which assure that existing QoS requirements for existing connections can continue to be met. The traffic rate resulting from the adjustment is referred to as the Allowable Cell Rate or ACR.

In an ATM connection from a source to a destination, flow control can be performed using a single large flow control loop extending from the source to the destination and back to the source. Resource Management cells (RM cells), special purpose ATM cells, are used to carry information used in controlling the data cell flow between source and destination. Where the RM cell carries actual flow rate information, that information is carried in an ER (Explicit Rate) field in the RM cell.

If the path between the source and the destination is long and a single large flow control loop is implemented, it takes time for flow control information to be generated at the real destination and then propagated back to the real source. By the time the real source can act on the information, traffic conditions within the network may have already changed.

Further, a path between a source and a destination will typically traverse multiple links, each of which normally carries traffic from multiple sources. Traffic conditions on any one of these links at a given time can be quite different from traffic conditions on other of the links. Where a single large flow control loop is employed, the flow control decisions that are made will not necessarily take conditions on a particular link into proper account and may lead to inefficient utilization of one or more of the links on the path defined by the large loop.

For reasons such as those given above, it may be advantageous to perform flow control in something other than a single source/destination loop. An ATM ABR connection can be divided into several adjacent segments. Each segment includes a virtual source and a virtual destination and forms its own flow control loop. An ATM Forum Traffic Management Specification, ATM Forum/af-tm-0056.000, defines general behavior for switches that act as virtual sources (VS) and virtual destinations (VD) in order to provide segmentation of an ATM connection. Each adjacent segment can independently choose most flow parameters with no need to coordinate its values with those chosen by other segments along the path of the connection.

In the ATM Forum Traffic Management Specification, the VS/VD mode of operation is defined to provide intrasegment flow control and congestion control. However, the ATM Forum Traffic Management Specification does not define intersegment operations: that is, it leaves methods for coupling the adjustment actions for a particular segment to adjustment actions of an adjacent segment up to the system implementers.

SUMMARY OF THE INVENTION

It is a general object of the present invention to provide an improved, simple method of operating a segmented ATM connection to minimize the amount of information that must be exchanged across segment boundaries. A system node which performs virtual source and virtual destination functions for adjacent segments is provided with common storage, an Allowable Cell Rate (ACR) table, for storing the current ACR value for the downstream segment served by the virtual source. The stored allowable cell rate is written into the table by the virtual source as a result of flow control calculations performed by the virtual source. The virtual destination for the next upstream segment can access the common storage and use the ACR value stored there as part of the process of determining an ACR value to be returned to the virtual source for its segment.

The advantages of the present invention will emerge more clearly from the following description of preferred embodiments and by reference to the appended drawings.

BRIEF DESCRIPTION OF THE DRAWINGS

FIG. 1 shows a cascaded ATM connection with certain switches having integrated VS/VD functionality.

FIG. 3 shows a cascaded ATM connection with certain switches in which the VS/VD functions are implemented in different physical devices.

DETAILED DESCRIPTION OF THE INVENTION

Figure 2:
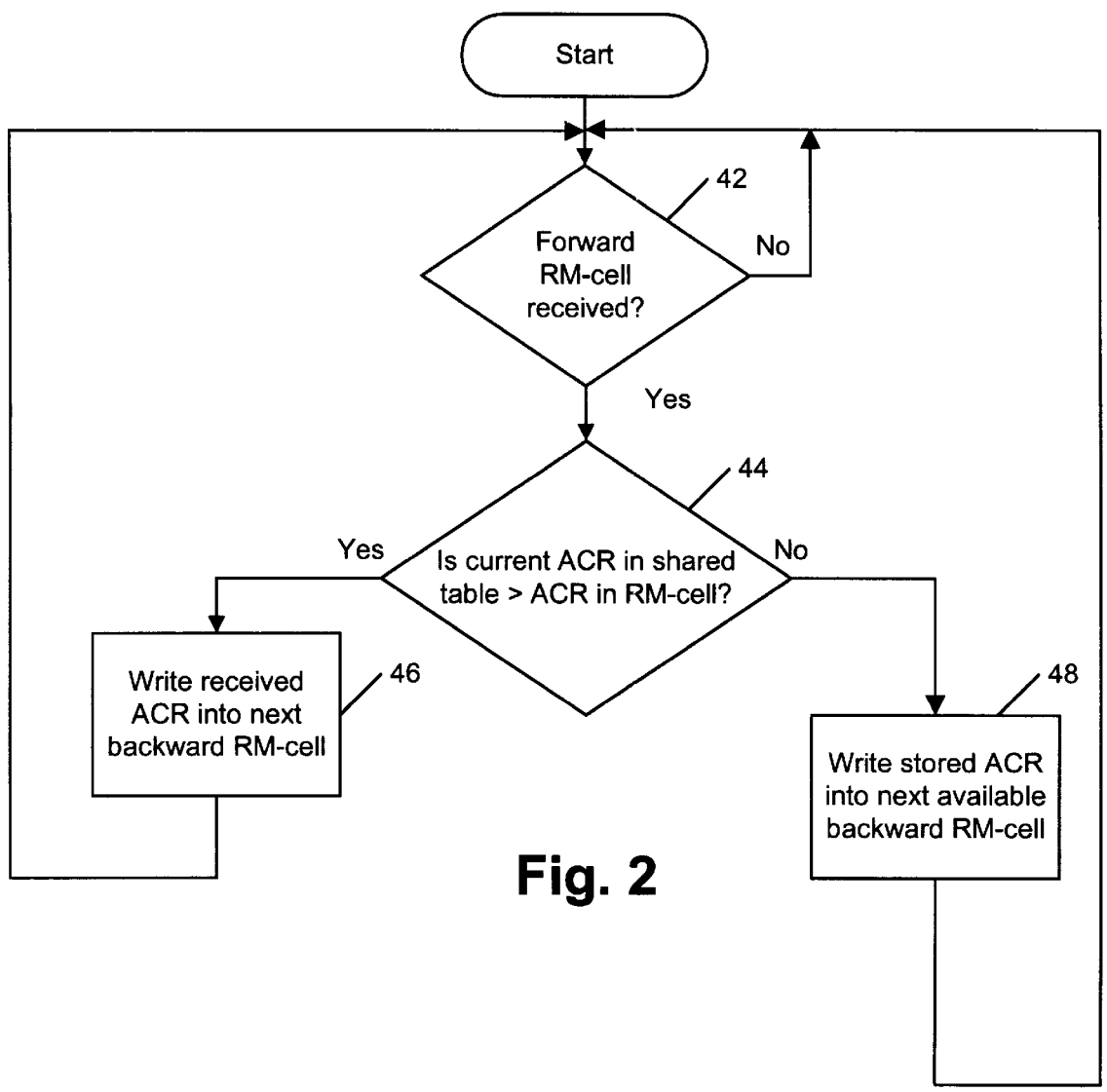
FIG. 2 is a basic flow chart of steps performed at a VS/VD switch to effect ACR parameter transfers across segment boundaries.

FIG. 1 illustrates an end-to-end ATM ABR connection constructed of three separate ABR segments. End-to-end ABR flow control in the connection occurs between a sending end system (source) 1 and a receiving end system (destination) 2. Source 1 and destination 2 are connected via a bi-directional connection. For a bi-directional ATM ABR connection, each connection termination point is both a source and a destination depending on the direction of data flow. For purposes of the remaining description, forward data flow occurs when data moves from the source 1 toward the destination 2 while backward data flow occurs when data moves from destination 2 toward the source 1.

RM cells are used to control data flow in the ATM ABR connection. The source 1 generates forward RM cells which are transported along the path toward the destination. When the RM cells reach the destination 2, they are turned around and sent back to the source 1 as backward RM cells. These backward RM cells carry feedback information provided by the elements of the ATM ABR connection and/or the destination 2 back to the source 1.

The ATM ABR connection in FIG. 1 is divided into three adjacent segments, each of which can carry out its own flow control operations. Subscripts are used in the following description to associate an entity with a given segment: for example, $VS_2$ 6 is the virtual source for segment 2. The description related to FIG. 1 uses upstream and downstream descriptors to relate adjacent devices or segments. The terms upstream and downstream are used to indicate the relative position of two devices or segments based on the direction of data flow. Generally, a component "A" is considered to be upstream from a component "B" where data flows from "A" to "B". Conversely, a component "A" is considered to be downstream from a component "B" where data flows from "B" to "A". For example, $VD_2$ 7 is downstream from $VS_2$ 6 with respect to the flow of data from the source 1 to the destination 2. Similarly, segment 2 is downstream from segment 1.

In FIG. 1, the VD function of an upstream segment and the VS function of an adjacent downstream segment are housed within a single switch at the boundary of the two segments. Switches 3 and 4 are examples of physical switches including both VS and VD functions. The first segment includes the source end system 1 and a virtual destination 5 in switch 3; the second segment includes a virtual source 6 in switch 3 and a virtual destination 7 in switch 4; and the third segment includes a virtual source 8 in switch 4 and destination end system 2.

In order to assure data cells can be transported from source 1 to destination 2 without encountering congestion anywhere along the entire connection, the following rule is implemented. No upstream segment can have a steady state ACR that is higher than the ACR of the immediately adjacent downstream segment on the path. To implement the rule, an upstream virtual destination (for example, $VD_1$ 5) must be made aware of the ACR in use by the virtual source of the adjacent downstream segment (for example, $VS_2$ 6). Just as a real destination provides feedback to a real source based on the rate at which an upper ATM layer application can accept data, so will a virtual destination for a given segment provide feedback to its virtual source about the rate at which its "application"—that is, the virtual source of the next downstream segment—can accept data.

FIG. 2 is a flow chart of steps that are performed in virtual destination logic at a VS/VD node at the boundary of one of the segments in order to provide feedback to the adjacent upstream virtual source for the segment. When a forward RM cell is received (42) at the virtual destination logic, the contents of the ER field in the RM cell are compared (44) to the current ACR value stored in the shared ACR table at the VS/VD node. If the comparison shows that the current downstream ACR is greater than the ACR received in the ER field (46), then the received ACR value is written into the next backward RM cell being sent toward the adjacent upstream virtual source. If the comparison shows that the current downstream ACR is equal to or less than the received ACR value, then the stored ACR value is written into the backward RM cell (48). The ACR value received in the ER field of the forward RM cell is, in effect, an upper bound on the ACR value that can be returned to the virtual source.

In a preferred embodiment, a virtual source for a segment performs allowable cell rate calculations for the adjacent downstream segment using standard ABR flow control algorithms. Those algorithms typically employ the ACR value returned by the segment's virtual destination but may also use system timers to trigger flow control actions. For example, if a virtual source does not receive a backward RM cell for a downstream segment for a predetermined period of time, the source may respond by reducing the allowable cell rate for the downstream segment.

The virtual source for a downstream segment and the virtual destination of the adjacent upstream segment have shared access to a common ACR table with the virtual source having write-access and the virtual destination having read-access only. When a VS/VD switch supports several ATM ABR connections, there is one entry in the ACR table for each ATM ABR connection served by the VS/VD switch. Whenever the VS/VD switch changes the ACR for a given ATM ABR segment, the virtual source for that segment writes a new ACR value into the table.

Within the VS/VD switch system, the only information that must be exchanged across the segment boundary is the current ACR value of the downstream segment. That current ACR value is made available to the source for the adjacent upstream segment for use by that source in executing its own ACR calculations.

The rules outlined above assure that a newly computed ACR will flow upstream in a timely fashion from a downstream segment to the source of the ATM ABR connection. The control flow information (ACR) exchanged between segments assures that, in steady state, the ACR of a given segment is always less than or equal to the ACR of the adjacent downstream segment.

The foregoing description assumes that VS and VD functionality is implemented in a single physical switch, such as either of switches 3 or 4. However, it is within the scope of the invention to provide such functionality in a distributed environment such as shown in FIG. 3 where each of systems 10 and 11, respectively, consists of two different physical devices communicating with each other over interposed subnetworks 12 and 13, respectively.

Up to this point, the discussion has been in terms of actions to be performed at virtual sources or virtual destinations for given segments along the complete physical path. However, each segment on a path may include additional intermediate switches located on the physical path between the virtual source and the virtual destination for the segment. These intermediate switches, such as switch 9 in FIG. 1, will provide feedback which permit ACR calculations to be performed for the segment in which they are found.

ABR service supports different types of ATM switches which implement different types of flow control. Switches which support use of ER (Explicit Rate) information can serve either as VS/VD switches or as intermediate switches. Another known type of switch that can be used as an intermediate switch transfers flow control information to the virtual destination of a segment using a Congestion Indicator (CI)/No_increase Indicator (NI) field in a regular data cell. In a standard mode of operation, if such a switch detects congestion, the CI indicator is set in data cells being switched toward the virtual destination. Another known, similar type of switch operates in a standard mode in which flow control information is transported in regular data cells using an Explicit Forward Congestion Indicator (EFCI) field in the cells.

While such switches can be used in implementing the present invention there is no need to explicitly forward CI, NI, ER or EFCI information across a segment boundary. Instead, for control of congestion, a given segment needs to know only the current ACR for the adjacent downstream segment.

Figure 6:
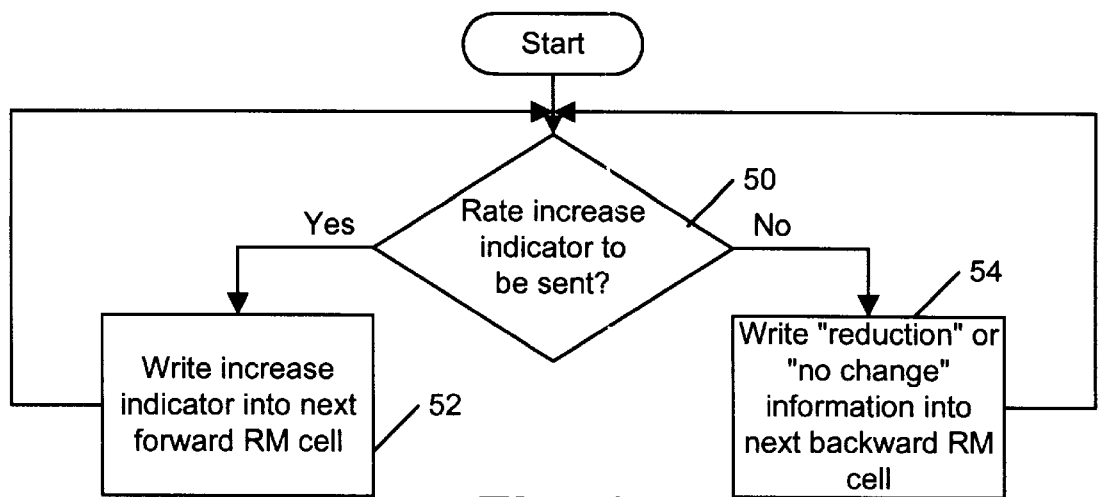
FIG. 6 is a flow chart of the basic flow control operations that are performed in a switch that is intermediate to VS/VD switches.

If an intermediate switch, such as switch 9, determines that a potential rate decrease may be required, the effectiveness of flow control operations may be enhanced by notifying the virtual source for the segment (VS$_2$ 6) of this determination as early as possible so that it can calculate a new lower ACR parameter for all of segment 2 and can update the common ACR table that it shares with VD$_1$ 5, the virtual destination for the adjacent upstream segment. To permit the ACR calculation to be performed as quickly as possible, switch 9 can operate in a mode in which the next available backward RM cell traversing segment 2 is intercepted and the appropriate feedback indicator is inserted. FIG. 6 is a high level flow chart of this mode of operation. If it is determined (50) at an intermediate switch that data could be accepted at a higher rate at the switch, then a rate-increase indicator is written (52) into the next forward RM cell. As already discussed, the type of indicator depends on the type of intermediate switch. By writing the increase-indicative indicator into a forward RM cell, downstream switches within the segment are given an opportunity to override this feedback indicator before the RM cell reaches the virtual destination VD$_2$ 7 for segment 2. By the time virtual destination VD$_2$ 7 acquires the forward RM cell, the feedback indicator written into that cell will reflect the most conservative (lowest data rate) feedback provided by any of the switches within segment 2. The virtual destination will generate and send a backward RM cell to the virtual source VS$_2$ 6 for segment 2.

If operation 50 had shown that the switch 9 could not accept data at a higher rate, the switch would intercept the next backward RM cell traversing the segment and would write (54) a "no change" or decrease-indicative feedback indicator into that cell.

The problem that would be encountered if switch 9 were to insert an increase-indicative signal into the first backward RM cell it encountered is that rate oscillations might be induced in segment 2. If switch 9 were to write an increase indicator into the first backward RM cell it encountered, that would lead to a higher ACR at the segment's virtual source. If, however, the following backward RM cell were to have a decrease indicator generated by a switch downstream of switch 9, then the virtual source would have to respond immediately by decreasing the segment ACR value. Thus, to insure timely rate reductions while minimizing rate oscillations, any intermediate switch in a segment should use the first available backward RM cell only when providing rate-decreasing feedback and the first available forward RM cell only when providing rate-increasing feedback.

Figure 4:
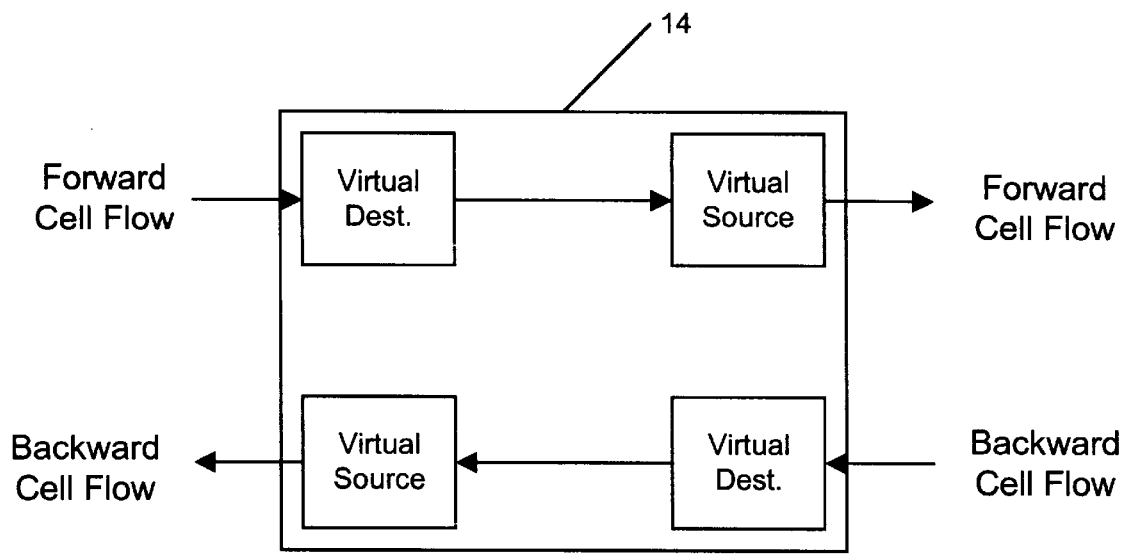
FIG. 4 shows a centralized implementation of VS/VD functionality in a switch.
Figure 5:
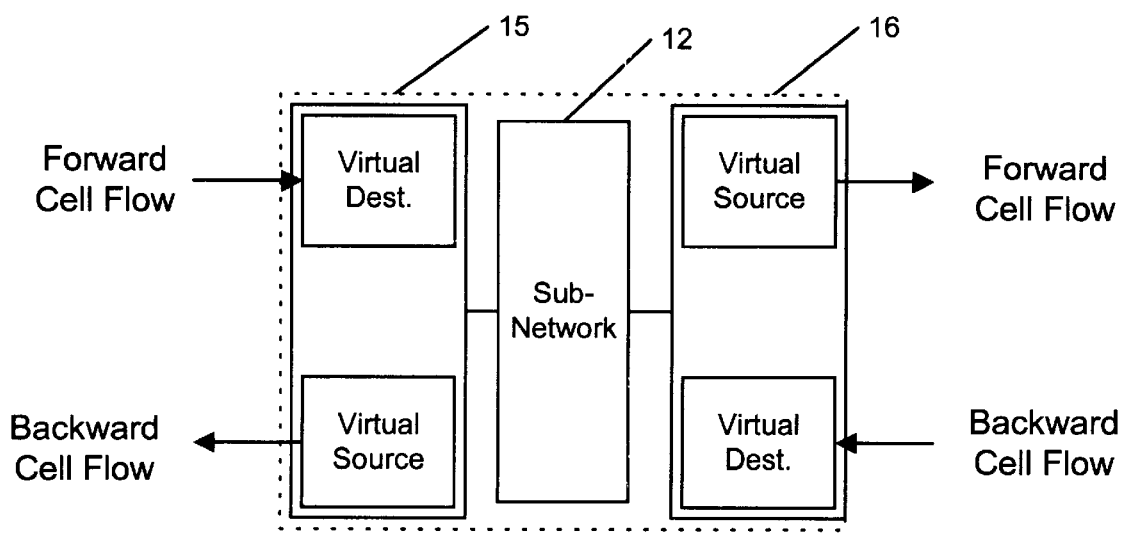
FIG. 5 shows a distributed implementation of VS/VD functionality in a switch.

Switches 3, 4, 10, 11, as shown in FIG. 1 and FIG. 2, that implement VS/VD functions are composed of two logical components; namely, a virtual source and a virtual destination. There are two generic configurations possible: A centralized configuration and a distributed configuration. In the centralized configuration (see FIG. 3), the virtual source function and the virtual destination function are housed within a single physical device 14, allowing information exchange between VS and VD to be accomplished internally. In the distributed configuration (see FIG. 4), there are two distinct physical switches 15, 16 connected by a communications subnetwork 12. One physical switch houses the virtual source function; the other houses the virtual destination function. Communication between the virtual source and the virtual destination is accomplished using any protocol that the two switches 15, 16 agree upon. A concrete example of such a configuration would be two NBBS (Networking Broad Band Services) ATM ABR access agents, one with VS and the other with VD, connected through an NBBS cloud.

Figure 7:
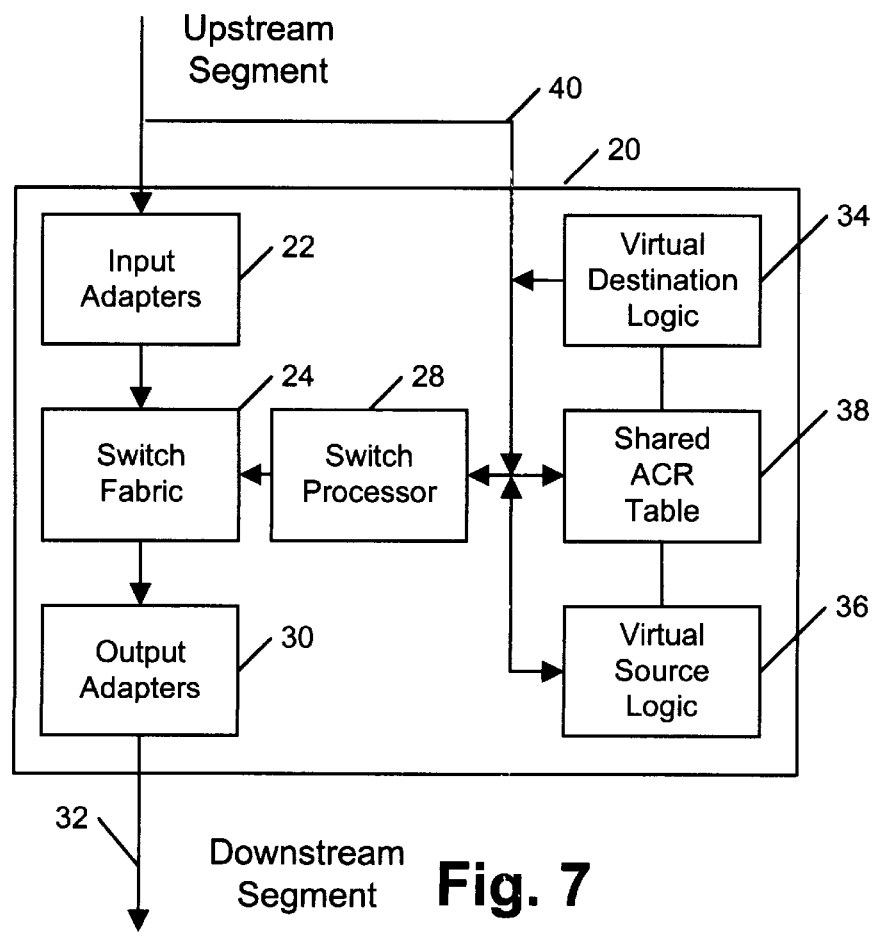
FIG. 7 shows greater detail of the functional structure of a VS/VD switch which can be used in implementing the present invention.

FIG. 7 is a more detailed view of a one embodiment of a VS/VD switch system 20 such as would be located at a segment boundary. For purposes of illustration only, an integrated configuration (both VS and VD function being within the same physical device) is assumed. A set 22 of input adapters receive data cells provided over upstream links 24. The data cells are delivered to a switch fabric 26 under the control of a switching processor 28. The switching fabric switches each incoming cell to an output port defined as part of the path to the cell's ultimate destination. A set 30 of output adapters queues the outgoing cells until they can be delivered to the appropriate link in a set 32 of downstream links.

In the switching system, virtual destination logic 34 is used to perform flow control functions for upstream connections while virtual source logic 36 is used to perform flow control functions for downstream connections. The logic sets 34 and 36 share access to a common ACR storage table 38, in which the calculated ACR or Allowable Cell Rate value for each downstream connection is written by virtual source logic 36. Virtual destination logic 34 has read-only access to the table 38 and can retrieve the stored ACR value for the downstream connection forming part of the same path as a particular upstream connection. The switch processor 28, the virtual destination logic 34, the virtual source logic 36 and the common ACR table 38 could be interconnected through a common control bus 40.

Of course, the present invention is not limited to the embodiments described and shown and encompasses variations which would occur to one of ordinary skill in the art without departing from the scope of the invention.

What is claimed is:

1. A flow control device for a data communication system having at least one established path between a real source and a real destination in the system, said path being divided into coupled segments, each segment forming a flow control loop and being terminated in at least one node capable of serving as a virtual source for the adjacent downstream segment and a virtual destination for the adjacent upstream segment, said flow control device comprising:

a switching processor for determining a current allowable cell rate (ACR) value to be implemented for the adjacent downstream segment;

a common ACR table for storing the current ACR value governing the flow of data on the adjacent downstream segment;

a write-only connection between said table and the switching processor to permit the processor to write the determined current ACR value into said table; and a read-only connection between said table and a virtual destination logic for the adjacent upstream segment to permit the virtual destination logic to retrieve the stored current ACR value for transfer to the source for the adjacent upstream segment.

2. A flow control device as defined in claim 1 wherein said common ACR table is a multi-location table for storing the current ACR values for each active downstream segment connected to the node containing said table.

3. A flow control device as defined in claim 1 or 2 wherein the current ACR value of the downstream segment is written into the common ACR table by a virtual source logic for a given downstream segment based on information received over the adjacent downstream segment.

4. A flow control device as defined in claim 3 wherein the data communication system comprises an Asynchronous Transfer Mode system providing Available Bit Rate traffic service.

5. For use in a data communication system having at least one established data path between a real source and a real destination in the system, said path being divided into coupled segments, each segment forming a flow control loop, at least one node at the connection between adjacent segments, said node including:

virtual source logic for the adjacent downstream segment;

virtual destination logic for the adjacent upstream segment;

a switching processor for determining a appropriate current allowable cell rate (ACR) value to be implemented for the adjacent downstream segment;

a common ACR table for storing at least the current ACR value governing the flow of data on the adjacent downstream segment;

a write-only connection between said table and the switching processor to permit the processor the write the current ACR value into said table; and a read-only connection between said table and the virtual destination for the adjacent upstream segment to permit the virtual destination logic to retrieve the stored current ACR value for transfer to the source for the adjacent upstream segment.

6. A node as defined in claim 5 wherein said common ACR table is a multi-location table for storing the current ACR values for each active downstream segment connected to said node.

7. A node as defined in claim 5 or 6 wherein the ACR value written into the common ACR table is computed by the virtual source logic of the adjacent downstream segment based on information received over that adjacent downstream segment.

8. For use at an intermediate node in a data communication system having at least one established path between a real source and a real destination in the system, said path being divided into coupled segments for flow control purposes, said intermediate node including a switching processor, virtual source logic for controlling data flow on the adjacent downstream segment and virtual destination logic for use in controlling data flow on the adjacent upstream logic, a flow control method comprising the steps of:

enabling the switching processor to write a current allowable cell rate (ACR) value for the adjacent downstream segment into a common ACR table;

enabling the virtual destination logic to access said common ACR table to retrieve the current ACR value stored there; and enabling the virtual destination logic to forward the accessed current ACR value in a resource management cell toward the source for the adjacent upstream segment.

9. A flow control method as defined in claim 8 wherein the common ACR table is a multi-location table for storing current ACR values for each active downstream segment connected to the node.

10. A flow control method as defined in claim 9 wherein the virtual destination logic determines the ACR value to be written into an explicit rate field of a resource management cell directed toward the source for the adjacent upstream segment by:

reading an explicit rate value contained in a resource management cell received over the adjacent upstream segment;

comparing the read explicit rate value to a currently used ACR value for the downstream segment; and replacing the stored read explicit rate value with the stored ACR value where the stored ACR value is less than the read explicit rate value.

* * * * *